United States Patent
Ma et al.

(10) Patent No.: US 11,205,071 B2
(45) Date of Patent: *Dec. 21, 2021

(54) IMAGE ACQUISITION METHOD, APPARATUS, SYSTEM, AND ELECTRONIC DEVICE

(71) Applicant: Advanced Technologies Co., Ltd., Grand Cayman (KY)

(72) Inventors: Chenguang Ma, Beijing (CN); Liang Li, Beijing (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/774,045

(22) Filed: Jan. 28, 2020

(65) Prior Publication Data

US 2020/0160028 A1 May 21, 2020

Related U.S. Application Data

(63) Continuation of application No. 16/508,639, filed on Jul. 11, 2019.

(30) Foreign Application Priority Data

Jul. 16, 2018 (CN) .......................... 201810777979.1

(51) Int. Cl.
*G06K 9/00* (2006.01)
*G06T 7/50* (2017.01)
(Continued)

(52) U.S. Cl.
CPC ....... *G06K 9/0061* (2013.01); *G06K 9/00248* (2013.01); *G06K 9/00281* (2013.01);
(Continued)

(58) Field of Classification Search
None
See application file for complete search history.

(56) References Cited

U.S. PATENT DOCUMENTS 6,714,665 B1 * 3/2004 Hanna ..................... G06K 9/00
382/117
7,043,056 B2 * 5/2006 Edwards ............ G06K 9/00248
382/103
(Continued)

FOREIGN PATENT DOCUMENTS

CN 101261677 A 9/2008
CN 104933419 A 9/2015
(Continued)

OTHER PUBLICATIONS

Nguyen et al., "Long range iris recognition: A survey." Pattern Recognition 72 (2017): 123-143. (Year: 2017).*
(Continued)

*Primary Examiner* — Feng Niu
(74) *Attorney, Agent, or Firm* — Finnegan, Henderson, Farabow, Garrett & Dunner, LLP (57) ABSTRACT

The present disclosure provides image acquisition methods, apparatuses, systems and electronic devices. One image acquisition method includes: acquiring an initial face image of a user by a first image acquisition apparatus; controlling a second image acquisition apparatus to acquire an eye print image of the user according to an acquisition parameter, the acquisition parameter being determined based on the initial face image; and synthesizing the initial face image and the eye print image into a target face image of the user.

11 Claims, 5 Drawing Sheets

(51) Int. Cl.
*G06K 9/20* (2006.01)
*G06K 9/34* (2006.01)
*G06T 7/11* (2017.01)

(52) U.S. Cl.
CPC ....... *G06K 9/00604* (2013.01); *G06K 9/2063* (2013.01); *G06K 9/342* (2013.01); *G06T 7/50* (2017.01); *G06T 7/11* (2017.01)

(56) References Cited

U.S. PATENT DOCUMENTS

| | | | | |
|---|---|---|---|---|
| 7,937,590 B2* | 5/2011 | Wuidart | ................ | G07C 9/257 713/186 |
| 8,111,879 B2* | 2/2012 | Phinney | ............. | G06K 9/00604 382/117 |
| 8,121,356 B2* | 2/2012 | Friedman | .......... | G06K 9/00255 382/115 |
| 8,433,103 B2* | 4/2013 | Friedman | .......... | G06K 9/00255 382/116 |
| 8,577,093 B2* | 11/2013 | Friedman | .......... | G06K 9/00604 382/115 |
| 8,854,446 B2* | 10/2014 | Bergen | .............. | G06K 9/00604 348/78 |
| 9,241,111 B1* | 1/2016 | Baldwin | ................ | G03B 35/08 |
| 9,798,384 B2* | 10/2017 | Strupczewski | ......... | G06F 3/012 |
| 10,417,494 B2* | 9/2019 | Ishii | ..................... | G06K 9/4604 |
| 10,489,680 B2* | 11/2019 | Aliabadi | ............ | G06K 9/6219 |
| 2003/0056122 A1* | 3/2003 | Wuidart | ................. | G06F 21/32 726/5 |
| 2003/0169907 A1* | 9/2003 | Edwards | ............ | G06K 9/00281 382/118 |
| 2007/0160308 A1* | 7/2007 | Jones | .................. | G06K 9/0061 382/260 |
| 2008/0069411 A1* | 3/2008 | Friedman | ........... | G06K 9/00604 382/118 |
| 2014/0089243 A1* | 3/2014 | Oppenheimer | .... | G08B 21/0275 706/46 |
| 2014/0184854 A1* | 7/2014 | Musatenko | ........ | H04N 5/23296 348/240.2 |
| 2015/0049179 A1* | 2/2015 | Son | .................... | G06K 9/00912 348/78 |
| 2015/0293588 A1* | 10/2015 | Strupczewski | .... | G06K 9/00597 382/117 |
| 2015/0347841 A1* | 12/2015 | Mears | ................ | G06K 9/00604 348/46 |
| 2016/0335495 A1 | 11/2016 | Kim et al. | | |
| 2017/0372136 A1* | 12/2017 | Andorko | ................. | G06T 7/74 |
| 2018/0052514 A1* | 2/2018 | Liu | .................... | G06K 9/00885 |
| 2018/0096226 A1* | 4/2018 | Aliabadi | ................ | G06K 9/623 |
| 2018/0137335 A1* | 5/2018 | Kim | ...................... | G06K 9/4628 |
| 2018/0302786 A1* | 10/2018 | Yu | ......................... | H04M 1/725 |
| 2018/0350030 A1* | 12/2018 | Simons | ................ | G06T 3/0068 |
| 2018/0357790 A1* | 12/2018 | Kojima | ................ | G06K 9/0061 |
| 2019/0065845 A1* | 2/2019 | Xu | ....................... | G06K 9/00604 |
| 2019/0073811 A1* | 3/2019 | Shah | ..................... | G06K 9/0061 |
| 2019/0258788 A1* | 8/2019 | Hyun | ................ | G06K 9/00885 |
| 2019/0259476 A1* | 8/2019 | Armijos | ................ | G16H 10/60 |
| 2020/0019751 A1* | 1/2020 | Ma | ..................... | G06K 9/00248 |
| 2020/0028844 A1* | 1/2020 | Aime | .................... | H04L 9/3231 |
| 2020/0043213 A1* | 2/2020 | Bao | ...................... | G06K 9/0061 |
| 2020/0076933 A1* | 3/2020 | Xiao | ...................... | G06F 21/32 |

FOREIGN PATENT DOCUMENTS

| | | |
|---|---|---|
| CN | 105825102 A | 8/2016 |
| CN | 106682620 A | 5/2017 |
| CN | 107223255 A | 9/2017 |
| CN | 107368775 A | 11/2017 |
| CN | 107862259 A | 3/2018 |
| JP | 2018046464 A | 3/2018 |
| WO | WO 2007/142621 A1 | 12/2007 |

OTHER PUBLICATIONS

International Search Report and the Written opinion dated Sep. 30, 2019, in counterpart International Application No. PCT/US2019/041316.

Gao et al., "Face and Iris Fusion Recognition Based on Adaboost," Computer Engineering (Mar. 2011), 37:148-150.

* cited by examiner

IMAGE ACQUISITION METHOD, APPARATUS, SYSTEM, AND ELECTRONIC DEVICE

CROSS-REFERENCE TO RELATED APPLICATION

This present application is a continuation of U.S. application Ser. No. 16/508,639, filed on Jul. 11, 2019, which is based upon and claims priority to Chinese Application No. 201810777979.1, filed on Jul. 16, 2018, which is incorporated herein by reference in its entirety.

TECHNICAL FIELD

The present disclosure generally relates to the field of computer technologies, and in particular, to image acquisition methods, apparatuses, systems and electronic devices.

TECHNICAL BACKGROUND

With the continuous development of pattern recognition, artificial intelligence and other technologies, biometric feature recognition technologies are attracting increasingly more attention. At present, biometric feature recognition mainly includes fingerprint recognition, face recognition, speech recognition, palmprint recognition, eye print recognition, iris recognition, facial expression recognition, and so on.

In order to improve the accuracy of biometric recognition, some technical personnel and research institutions are considering combining face recognition with eye recognition (such as eye print recognition and iris recognition). The proposed techniques seek to address the problem of inaccurate face recognition for similar faces, such as in cases of identical twins. Problems exist with such proposals. For example, ordinary RGB cameras can generally meet the acquisition requirements for face recognition. However, due to issues such as limited resolutions, limited Depth of Field (DoF), and limited Field of View (FoV), ordinary RGB cameras cannot achieve accurate acquisition of the eye region. Accordingly, there is a need for optimized image acquisition solutions to improve the accuracy of face recognition.

SUMMARY

In view of the above, embodiments of the specification provide image acquisition methods, apparatuses, systems and electronic devices. One advantage of the embodiments disclosed herein is to provide optimized solutions for face image acquisition.

In one aspect, an image acquisition method comprises: acquiring an initial face image of a user by a first image acquisition apparatus; controlling a second image acquisition apparatus to acquire an eye print image of the user according to an acquisition parameter, the acquisition parameter being determined based on the initial face image; and synthesizing the initial face image and the eye print image into a target face image of the user.

In another aspect, an image acquisition apparatus comprises: a first acquisition unit configured to acquire an initial face image of a user by a first image acquisition apparatus; a second acquisition unit configured to control a second image acquisition apparatus to acquire an eye print image of the user according to an acquisition parameter, the acquisition parameter being determined based on the initial face image; and a synthesis unit configured to synthesize the initial face image and the eye print image into a target face image of the user.

In yet another aspect, an image acquisition system comprises a first image acquisition apparatus, a second image acquisition apparatus, a control apparatus, and a synthesis apparatus. The first image acquisition apparatus is configured to acquire an initial face image of a user. The second image acquisition apparatus is configured to acquire an eye print image of the user. The control apparatus is configured to control the second image acquisition apparatus to acquire the eye print image of the user according to an acquisition parameter. The synthesis apparatus is configured to synthesize the initial face image and the eye print image into a target face image of the user.

In yet another aspect, an electronic device comprises: a processor, and a memory configured to store a set of computer executable instructions. When executed, the executable instructions cause the processor to perform: acquiring an initial face image of a user by a first image acquisition apparatus; controlling a second image acquisition apparatus to acquire an eye print image of the user according to an acquisition parameter, the acquisition parameter being determined based on the initial face image; and synthesizing the initial face image and the eye print image into a target face image of the user.

In yet another aspect, a computer-readable storage medium storing one or more programs is provided. When executed by a processor of an electronic device, the one or more programs cause the electronic device to perform: acquiring an initial face image of a user by a first image acquisition apparatus; controlling a second image acquisition apparatus to acquire an eye print image of the user according to an acquisition parameter, the acquisition parameter being determined based on the initial face image; and synthesizing the initial face image and the eye print image into a target face image of the user.

The technical solutions provided in the embodiments of this specification have at least the following technical advantages. When a face image of a user is acquired, an initial face image of the user can be acquired by a first image acquisition apparatus. An acquisition parameter can be determined based on the initial face image. Then a second image acquisition apparatus can be controlled to acquire an eye print image of the user according to the acquisition parameter. The initial face image and the eye print image are synthesized into a target face image of the user. As such, the acquired face image includes the face image of the user as well as an eye region image of the user. The eye region image is the eye print image of the user. On one hand, the accuracy of face recognition can be improved. On the other hand, the second image acquisition apparatus can be controlled to acquire the eye print image of the user based on the initial face image of the user, thereby avoiding the need for the user to adjust his/her own acquisition angle. User experience can therefore be improved.

BRIEF DESCRIPTION OF THE DRAWINGS

The accompanying drawings described herein are provided for further comprehension of the specification and constitute a part of the present application. The embodiments of the specification and the description thereof are used for illustration purposes, and they do not constitute any improper limitation on the scope of to the specification.

DETAILED DESCRIPTION

Exemplary embodiments are described in detail in the following and are illustrated in the drawings. It is appreciated that the embodiments described below and illustrated in the drawings are exemplary only. They do not constitute any limitations on the scope of the present disclosure.

In order to solve the problem that existing face image acquisition methods are not optimized enough, an image acquisition method is provided in the embodiments of this specification. The image acquisition method provided in the embodiments may be executed by, but not limited to, at least one of user terminals that are configured to perform the method provided in the embodiments such as mobile phones, tablet computers, and wearable devices. Or, the method may also be executed by a client terminal that can perform the method.

In the following description, as an example, the method is described as being performed by a mobile terminal. It should be appreciated that the method being performed by a mobile terminal is only exemplary. In other embodiments, the method may be performed by other devices.

Figure 1:
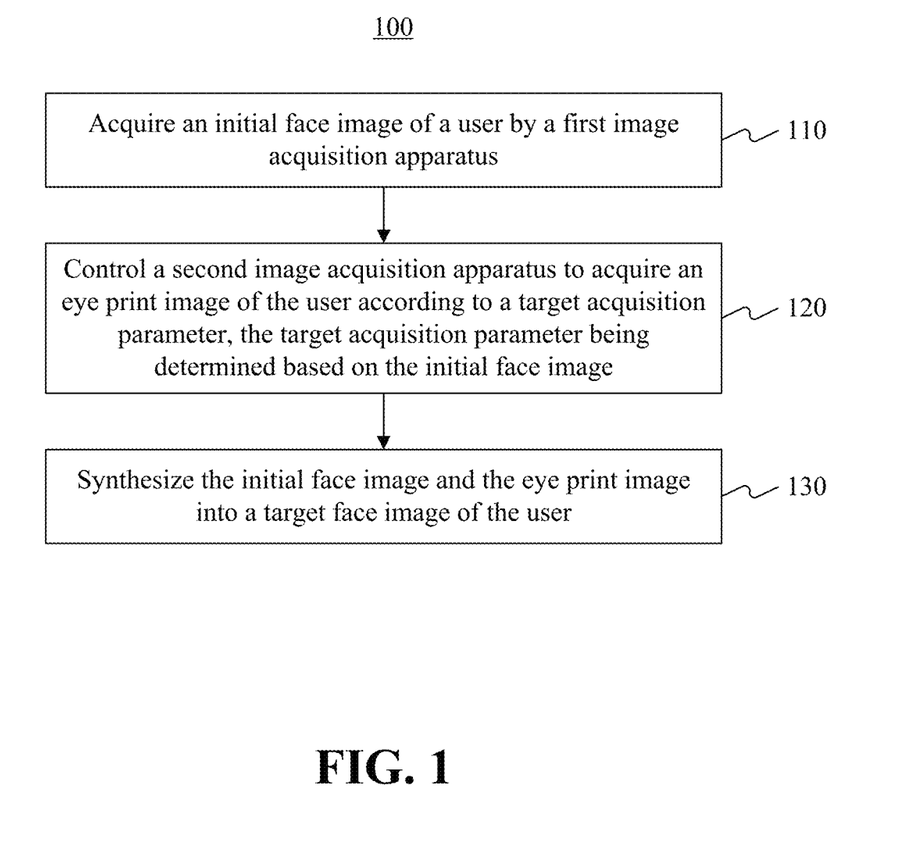
FIG. 1 is a flow chart of an image acquisition method according to an embodiment.

FIG. 1 is a flow chart of an image acquisition method 100 according to an embodiment. As shown in FIG. 1, the image acquisition method 100 includes the following steps 110-130.

In step 110, an initial face image of a user is acquired by a first image acquisition apparatus.

As noted in the Technical Background, existing ordinary RGB cameras for face image acquisition can generally meet the acquisition requirements for face recognition. However, for acquisition of eye prints in an eye region, ordinary RGB cameras may have the following problems. Ordinary RGB cameras have limited resolutions, which may not deliver high resolution of the acquired eye prints in the eye region. Further, ordinary RGB cameras have a limited DoF, which may not ensure accurate focusing on the eye region. In addition, ordinary RGB cameras have a limited FoV, which makes it difficult to maintain a wide FoV while capturing the eye prints in the eye region and difficult to acquire eye prints of users of different heights.

Some existing iris imaging techniques perform iris acquisition using a single camera. Imaging DoF and FoV of the single camera used are both limited. Image acquisition of the eye region requires the user to be in a specific position, which affects user experience. In addition, iris acquisition also requires adding an infrared light supplementing component and an infrared filter to an imaging system, which increases complexity of the imaging system.

In order to address the above problems, according to the image acquisition methods provided in an embodiment of this specification, a first image acquisition apparatus is configured to acquire an initial face image of a user and a second image acquisition apparatus is configured to acquire an eye print image of the user. That way, acquisition of a face image and an eye image can be performed at the same time. The first image acquisition apparatus can acquire the initial face image of the user in different manners. In some embodiments, the initial face image may be acquired based on a face video stream of the user acquired by the first image acquisition apparatus in real time.

In step 120, a second image acquisition apparatus is controlled to acquire an eye print image of the user according to a target acquisition parameter, the target acquisition parameter being determined based on the initial face image.

As noted above, with the existing techniques, user experience is affected as the user may need to be in a specific position in order to perform image acquisition of the eye region. According to some embodiments of this specification, a second image acquisition apparatus is controlled to acquire an eye print image of the user according to a target acquisition parameter. The target acquisition parameter of the second image acquisition apparatus can be determined based on the initial face image. Then the second image acquisition apparatus is controlled to acquire the eye print image of the user based on the target acquisition parameter. The target acquisition parameter can include parameter information such as an acquisition angle and an acquisition height of the second image acquisition apparatus. That way, it is no longer needed for the user to adjust his/her own height or angle multiple times to cooperate with the second image acquisition apparatus for acquiring an eye print image. User experience can therefore be improved.

Different users may have different heights and different pupillary distances. In order to ensure that the second image acquisition apparatus can acquire a clear eye print image, the determining a target acquisition parameter of the second image acquisition apparatus based on the initial face image can include the following procedures. First, spatial location information of the user's eye region can be determined based on the initial face image of the user. For example, key points can be located based on the initial face image of the user to facilitate determining the spatial location information of the user's eye region. A target acquisition parameter of the second image acquisition apparatus can be determined based on the spatial location information of the user's eye region. For example, a target acquisition parameter can be an optimal acquisition angle or acquisition height. The spatial location information of the user's eye region can include pupil center location information of the user's eyes.

In an embodiment, in order to ensure that the second image acquisition apparatus can acquire a sufficiently clear eye print image, the controlling a second image acquisition apparatus to acquire an eye print image of the user according to a target acquisition parameter may include the following procedures. First, the second image acquisition apparatus can be controlled to acquire an eye region image of the user according to the target acquisition parameter. The eye region image of the user can then be segmented by using a full convolutional depth neural network, to acquire an eye print image of which the sharpness meets a preset condition. As the eye region image of the user is segmented by the full convolutional depth neural network, the quality of the acquired eye print image can be quickly evaluated. That way, it can help the second image acquisition apparatus to focus, and to obtain a sufficiently clear eye print image.

In some embodiments, the first image acquisition apparatus is configured to acquire a face image of the user, the second image acquisition apparatus is configured to acquire an eye print image of the user. The first image acquisition apparatus and the second image acquisition apparatus can have different FoV requirements. In order to meet the different acquisition requirements, a camera with a large FoV may be selected for the first image acquisition apparatus, and a camera with a small FoV may be selected for the second image acquisition apparatus. That is, the FoV of the first image acquisition apparatus can be greater than that of the second image acquisition apparatus. For example, the FoV of the first image acquisition apparatus can be greater than or equal to 45° *100°; and the FoV of the second image acquisition apparatus can be greater than or equal to 50 mm*140 mm.

In the forgoing example, other parameters of the first image acquisition apparatus and the second image acquisition apparatus can be as follows: a spatial resolution of the first image acquisition apparatus can be greater than or equal to 2 mm, an imaging distance range can be 500 mm to 1000 mm, and an image frame rate can be greater than or equal to 15 fps. A spatial resolution of the second image acquisition apparatus can be no less than 3-5 line pairs/mm.

As gimbals provide relatively high accuracy and are easy to control, the second image acquisition apparatus can be controlled by a gimbal, e.g., a steering gimbal, a servo gimbal, etc., to adjust acquisition parameters such as an image acquisition angle, according to an embodiment. The step of controlling a second image acquisition apparatus to acquire an eye print image of the user according to a target acquisition parameter may include: controlling the second image acquisition apparatus by using a gimbal to acquire the eye print image of the user according to the target acquisition parameter.

In an embodiment, a lens of the second image acquisition apparatus may be an optical zoom lens or a prime lens. If the lens of the second image acquisition apparatus is an optical zoom lens, the optical zoom lens can ensure a consistent acquisition resolution for acquisition of the eye print image at different distances. If the lens of the second image acquisition apparatus is a prime lens, digital zoom can be used to facilitate adjustment of a lens focal length to obtain a clear eye print image. Using digital zoom with the prime lens may reduce the cost of the whole image acquisition system, but the sharpness of the eye print image acquired may be affected compared with that of the eye print image acquired by the optical zoom lens. In addition, in order to ensure that the second image acquisition apparatus can acquire an eye print image of which the sharpness meets a preset condition, no matter which lens is used by the second image acquisition apparatus, the DoF of the lens can be greater than or equal to 2 cm.

Figure 2:
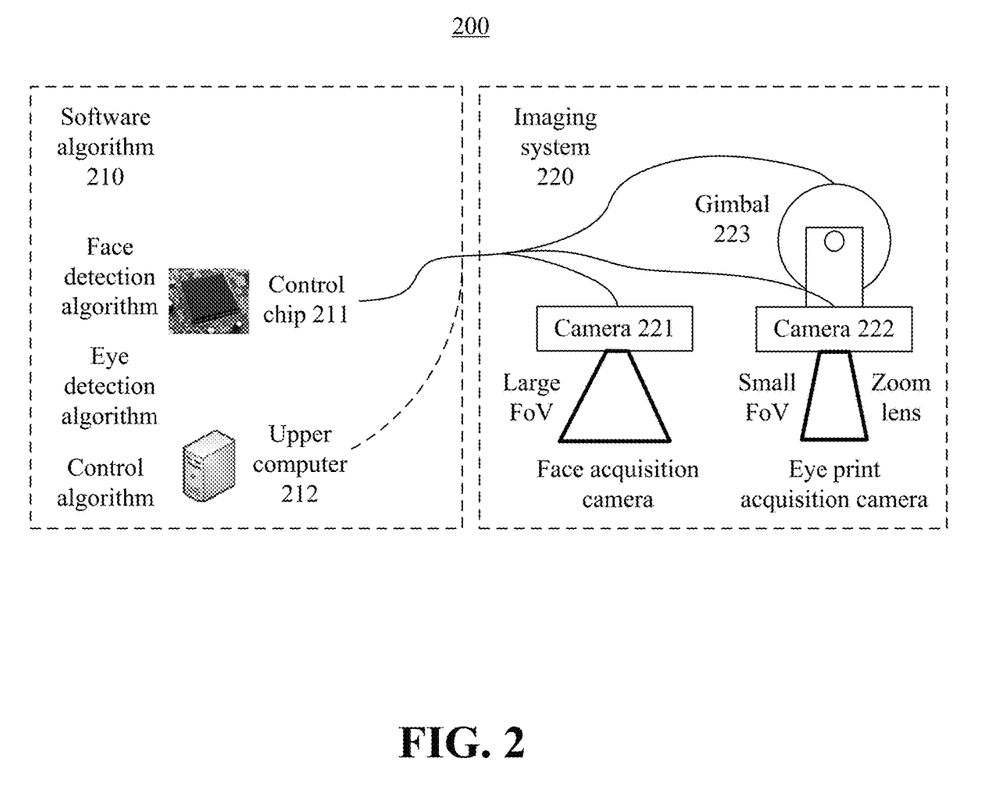
FIG. 2 is a schematic diagram illustrating an image acquisition method applied to an actual scenario according to an embodiment.

FIG. 2 is a schematic diagram illustrating an image acquisition method applied to an actual scenario 200 according to one embodiment. The diagram in FIG. 2 illustrates two aspects of the application scenario 200: a software algorithm 210 and an imaging system 220. The imaging system 220 includes a camera 221, which is a face acquisition camera with a large FoV; a camera 222, which is an eye print acquisition camera with a small FoV; and a gimbal 223, e.g., a steering gimbal, a servo gimbal, etc., configured to control an acquisition parameter of the camera 222. It is appreciated that the camera 221 can serve as the first image acquisition apparatus described above, and the camera 222 can serve as the second image acquisition apparatus described above and can be a camera using an optical zoom lens.

The software algorithm 210 mainly includes face detection algorithm(s), eye detection algorithm(s), and control algorithm(s), which can be stored in a control chip 211 or stored in an upper computer 212.

As an example, the process of acquiring an initial face image and an eye print image of a user in the scenario illustrated in FIG. 2 can include: acquiring a face video stream of the user by the camera 221; acquiring the face video stream by the control chip 211 or the upper computer 212; acquiring an initial face image by face detection, acquiring pupil center location information of two eyes of the user by key point locating and eye detection, and determining a target acquisition parameter of the camera 222 based on the location information; sending the target acquisition parameter to the gimbal 223; and controlling the camera 222, by the gimbal 223 after the target acquisition parameter is received, to acquire the eye print image of the user according to the target acquisition parameter.

Referring back to FIG. 1, in step 130, the initial face image and the eye print image are synthesized into a target face image of the user.

After the initial face image of the user is acquired by the first image acquisition apparatus and the eye print image of the user is acquired by the second image acquisition apparatus respectively, the initial face image and the eye print image can be synthesized into a target face image of the user. When performing identity verification for the user, identity verification can be carried out using a combination of the face image and the eye print image. Eye print image recognition can be used to distinguish people's identity according to arrangements of blood vessels in the white area of the human eye. Every person has a unique eye print. Even twins with a high facial similarity have different arrangements of blood vessels in their eye prints. Therefore, identity verification carried out using a combination of the face image and the eye print image can be more accurate.

According to the above-described embodiments, an initial face image of the user can be acquired by a first image acquisition apparatus, based on which a target acquisition parameter can be determined. Then a second image acquisition apparatus can be controlled to acquire an eye print image of the user according to a target acquisition parameter. The initial face image and the eye print image can be synthesized into a target face image of the user. As such, the acquired face image includes the face image of the user and an eye region image of the user, which is the eye print image of the user. On one hand, the accuracy of face recognition can be improved. On the other hand, the second image acquisition apparatus can also be controlled to acquire the eye print image of the user based on the initial face image of the user, thus avoiding the situation that the user needs to adjust his/her own acquisition angle. User experience can therefore be improved.

Figure 3:
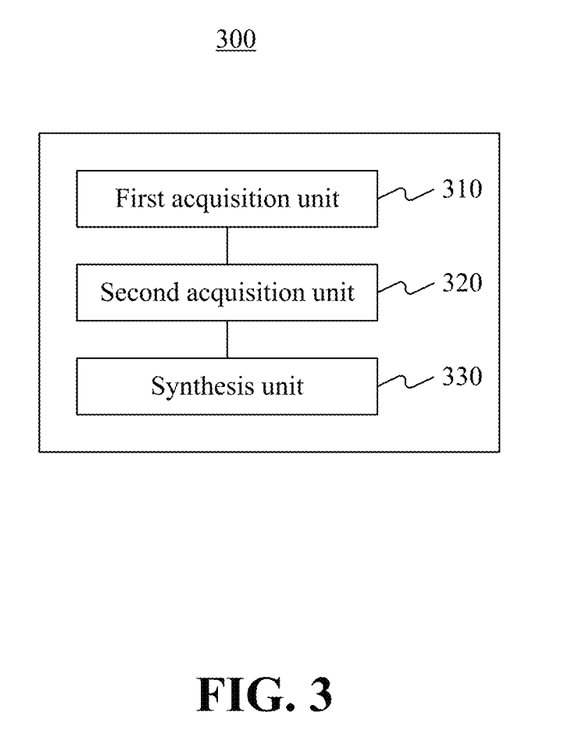
FIG. 3 is a schematic diagram of an image acquisition apparatus according to an embodiment.

FIG. 3 is a schematic diagram of an image acquisition apparatus 300 according to an embodiment. Referring to FIG. 3, the image acquisition apparatus 300 can include a first acquisition unit 310, a second acquisition unit 320, and a synthesis unit 330.

The first acquisition unit 310 is configured to acquire an initial face image of a user by a first image acquisition apparatus.

The second acquisition unit 320 is configured to control a second image acquisition apparatus to acquire an eye print image of the user according to a target acquisition parameter, the target acquisition parameter being determined based on the initial face image.

The synthesis unit 330 is configured to synthesize the initial face image and the eye print image into a target face image of the user.

With the image acquisition apparatus 300, the first acquisition unit 310 can acquire an initial face image of the user by a first image acquisition apparatus. A target acquisition parameter can be determined based on the initial face image. The second acquisition unit 320 controls a second image acquisition apparatus to acquire an eye print image of the user according to the target acquisition parameter. Finally, the initial face image and the eye print image are synthesized into a target face image of the user by the synthesis unit 330. As such, the acquired face image includes the face image of the user and an eye region image of the user, which is the eye print image of the user. On one hand, the accuracy of face recognition can be improved. On the other hand, the second image acquisition apparatus can be controlled to acquire the eye print image of the user based on the initial face image of the user, thus avoiding the situation that the user needs to adjust his/her own acquisition angle. User experience can therefore be improved.

In an embodiment, the second acquisition unit 320 is configured to: determine a target acquisition parameter of the second image acquisition apparatus based on the initial face image; and control the second image acquisition apparatus to acquire the eye print image of the user based on the target acquisition parameter.

In an embodiment, the second acquisition unit 320 is configured to: determine eye region spatial location information of the user based on the initial face image of the user; and determine the target acquisition parameter of the second image acquisition apparatus based on the eye region spatial location information of the user.

In an embodiment, the second acquisition unit 320 is configured to: control the second image acquisition apparatus to acquire an eye region image of the user according to the target acquisition parameter; and segment the eye region image of the user by a full convolutional depth neural network to acquire an eye print image of which the sharpness meets a preset condition.

In an embodiment, an FoV of the first image acquisition apparatus is greater than that of the second image acquisition apparatus.

In an embodiment, the FoV of the first image acquisition apparatus is greater than or equal to 45° *100°; and the FoV of the second image acquisition apparatus is greater than or equal to 50 mm*140 mm.

In an embodiment, the second acquisition unit 320 is configured to: control the second image acquisition apparatus by using a gimbal, e.g., a steering gimbal, a servo gimbal, etc., to acquire the eye print image of the user according to the target acquisition parameter.

In an embodiment, a lens of the second image acquisition apparatus is an optical zoom lens or a prime lens.

In an implementation manner, the DoF of the second image acquisition apparatus is greater than or equal to 2 cm.

In an embodiment, the eye region spatial location information of the user includes pupil center location information of two eyes of the user.

It is appreciated that the image acquisition apparatus 300 can implement the methods described above in connection with FIG. 1 and FIG. 2. Reference can be made to the description above, which is not repeated herein.

Figure 4:
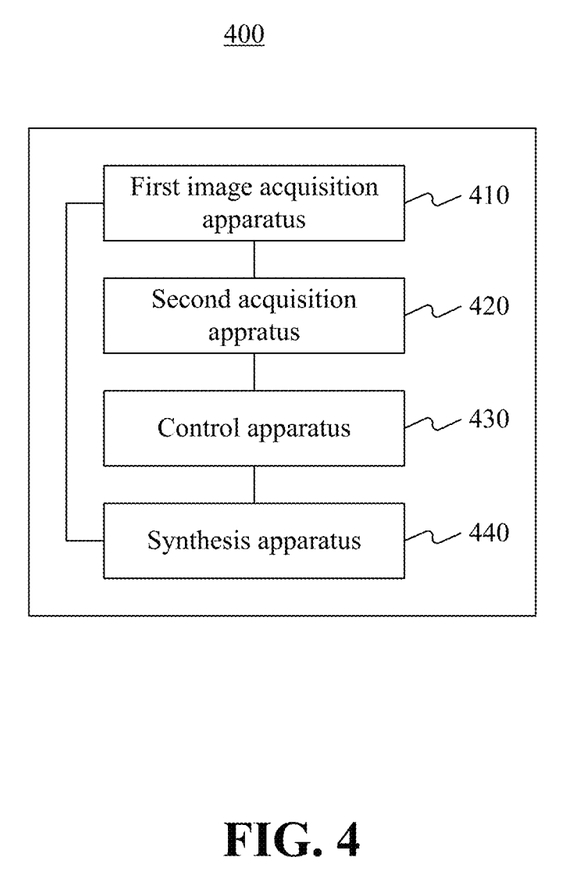
FIG. 4 is a schematic diagram of an image acquisition system according to an embodiment.

FIG. 4 is a schematic diagram of an image acquisition system 400 according to an embodiment of this specification. Referring to FIG. 4, the image acquisition system 400 can include a first image acquisition apparatus 410, a second image acquisition apparatus 420, a control apparatus 430, and a synthesis apparatus 440.

The first image acquisition apparatus 410 is configured to acquire an initial face image of a user.

The second image acquisition apparatus 420 is configured to acquire an eye print image of the user.

The control apparatus 430 is configured to control the second image acquisition apparatus 420 to acquire the eye print image of the user according to a target acquisition parameter.

The synthesis apparatus 440 is configured to synthesize the initial face image and the eye print image into a target face image of the user.

In an embodiment, the control apparatus 430 is configured to: determine a target acquisition parameter of the second image acquisition apparatus based on the initial face image; and control the second image acquisition apparatus to acquire the eye print image of the user based on the target acquisition parameter.

In an embodiment, the control apparatus 430 is configured to: determine eye region spatial location information of the user based on the initial face image of the user; and determine the target acquisition parameter of the second image acquisition apparatus based on the eye region spatial location information of the user.

In an embodiment, the control apparatus 430 is configured to: control the second image acquisition apparatus to acquire an eye region image of the user according to the target acquisition parameter; and segment the eye region image of the user by a full convolutional depth neural network to acquire an eye print image of which the sharpness meets a preset condition.

In an embodiment, an FoV of the first image acquisition apparatus 410 is greater than that of the second image acquisition apparatus 420.

In an embodiment, the FoV of the first image acquisition apparatus 410 is greater than or equal to 45° *100°; and the FoV of the second image acquisition apparatus 420 is greater than or equal to 50 mm*140 mm.

In an embodiment, the control apparatus 430 is configured to: control the second image acquisition apparatus by using a gimbal, e.g., a steering gimbal, a servo gimbal, etc., to acquire the eye print image of the user according to the target acquisition parameter.

In an embodiment, a lens of the second image acquisition apparatus 420 is an optical zoom lens or a prime lens.

In an embodiment, the DoF of the second image acquisition apparatus 420 is greater than or equal to 2 cm.

In an embodiment, the eye region spatial location information of the user includes pupil center location information of two eyes of the user.

It is appreciated that the image acquisition system 400 can implement the methods described above in connection with FIG. 1 and FIG. 2. Reference can be made to the description above, which is not repeated herein.

Figure 5:
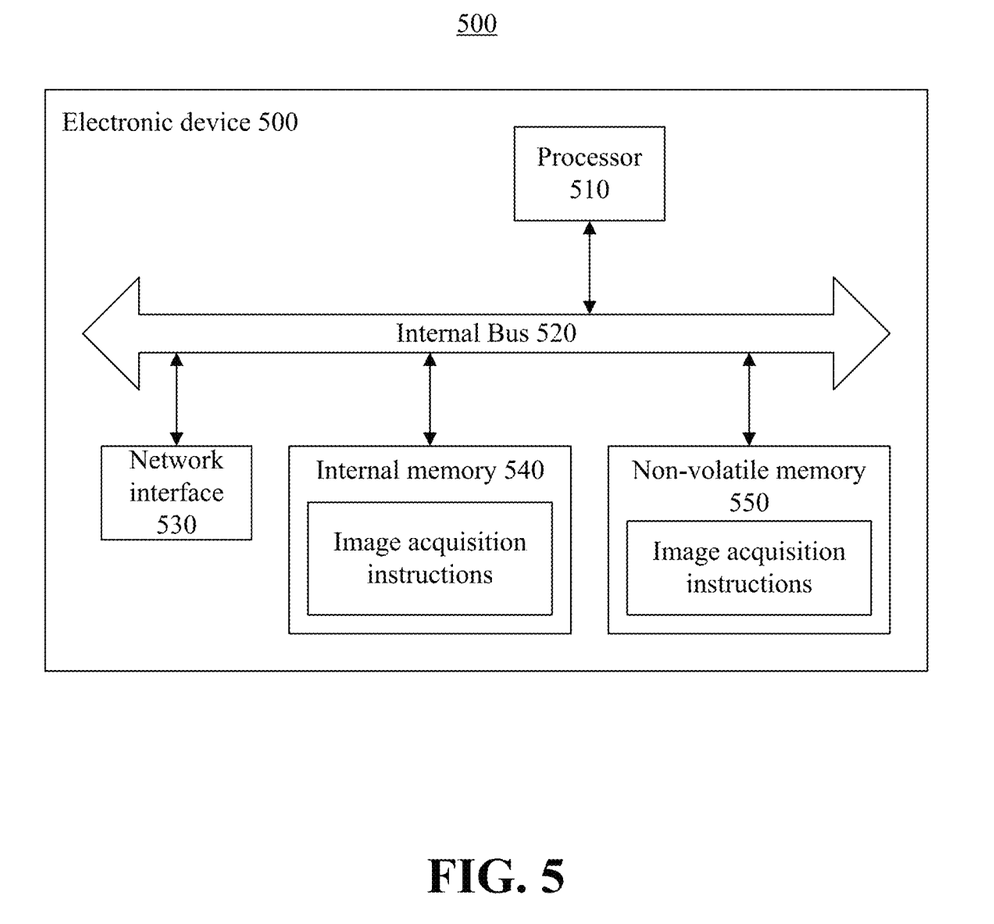
FIG. 5 is a schematic diagram of an electronic device according to an embodiment.

FIG. 5 is a schematic diagram of an electronic device 500 according to an embodiment. Referring to FIG. 5, the electronic device 500 includes a processor 510, an internal bus 520, a network interface 530, and a memory, such as an internal memory 540 or a non-volatile memory 550. The internal memory 540 may include a memory such as a high-speed Random-Access Memory (RAM). The non-volatile memory 550 may include, for example, one magnetic disk memory. It is appreciated that the electronic device 500 may further include other hardware components, which are not limited herein.

The processor 510, the network interface 530, and the memory may be interconnected through the internal bus 520. The internal bus 520 may be an Industry Standard Architecture (ISA) bus, a Peripheral Component Interconnect (PCI) bus, an Extended Industry Standard Architecture (EISA) bus, or the like. The internal bus 520 may further be classified into an address bus, a data bus, a control bus, and the like. It is appreciated that the electronic device 500 may include more than one bus and may include different types of buses.

The internal memory 540 and the non-volatile memory 550 are configured to store a program. The program may include program codes or computer-executable instructions that can be executed the by processor 510. For example, the processor 510 can read the program codes or computer-executable instructions to perform the following procedures: acquiring an initial face image of a user by a first image acquisition apparatus; controlling a second image acquisition apparatus to acquire an eye print image of the user according to a target acquisition parameter, the target acquisition parameter being determined based on the initial face image; and synthesizing the initial face image and the eye print image into a target face image of the user.

It is appreciated that the processor 510 may further execute instructions to perform methods described above in connection with FIG. 1. The processor 510 may be an integrated circuit chip having a signal processing capability. In the process of implementation, various steps of the above described methods may be performed by an integrated logic circuit of hardware in the processor, by executing corresponding instructions in the form of software. The processor 510 may be a general-purpose processor, such as a Central Processing Unit (CPU), a Network Processor (NP), etc. The processor 510 may also be a Digital Signal Processor (DSP), an Application Specific Integrated Circuit (ASIC), a Field-Programmable Gate Array (FPGA) or another programmable logic device, a discrete gate or transistor logic device, or a discrete hardware component.

Further, the general-purpose processor may be a microprocessor, or any other types of processors. The steps of the methods described above may be directly performed by a hardware decoding processor or may be performed by a combination of hardware and software modules in the decoding processor. The software module can be located in a storage medium, such as a random-access memory, a flash memory, a read-only memory, a programmable read-only memory or an electrically erasable programmable memory, a register, and the like. The storage medium can be located in the memory, and the processor can read the information in the memory and perform the steps of the above-described method embodiments. Further, it is appreciated that in addition to the software implementation manner, the electronic device 500 may also be implemented in other implementation manners, such as in the form of logic devices or a combination of software and hardware.

The computer readable medium can include non-volatile and volatile media as well as movable and non-movable media, which can implement information storage by means of various techniques. The information may be a computer readable instruction, a data structure, and a module of a program or other data. Examples of the storage medium of a computer include, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible to a computing device. Further, as used in this specification, the computer readable medium does not include transitory media, such as a modulated data signal or a carrier.

Each of the above described units may be implemented as software, or hardware, or a combination of software and hardware. For example, each of the above described units may be implemented using a processor executing instructions stored in a memory. Also, for example, each of the above described units may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

The systems, apparatuses, modules or units illustrated in the above embodiments may be implemented by a computer chip or a computing entity, or by a product having a certain function. A typical implementation device can be a computer. For example, the computer may be a personal computer, a laptop computer, a cellular phone, a camera phone, a smart phone, a personal digital assistant, a media player, a navigation device, an email device, a game console, a tablet computer, a wearable device, or a combination of any of these devices.

It is appreciated that the terms "include," "comprise" or any other variations thereof are intended to cover non-exclusive inclusion. That is, a process, method, article or device including a series of elements may not only include the elements, but also include other elements not expressly listed, or further include elements inherent to the process, method, article or device. In the absence of specific limitations, an element defined by "including a/an . . . " does not exclude that the process, method, article or device includes a plurality of identical elements, or other elements.

The above description provides only exemplary embodiments of the specification and is not intended to limit the specification. Various changes and modifications can be made to the embodiments by those skilled in the art, consistent with the specification. Any modifications, equivalent substitutions, improvements, etc. made within the spirit and scope of the specification shall all fall within the scope defined in the appended claims.

The invention claimed is:

1. An image acquisition method, comprising:
 acquiring an initial face image of a user by a first image acquisition apparatus;
 determining an acquisition parameter of a second image acquisition apparatus based on the initial face image of the user, wherein determining the acquisition parameter comprises:
  determining eye region spatial location information of the user based on the initial face image of the user; and
  determining the acquisition parameter based on the eye region spatial location information of the user, wherein the eye region spatial location information of the user comprises location information of two pupil centers of the user;
 sending the acquisition parameter to a gimbal;
 controlling, by the gimbal, the second image acquisition apparatus to acquire an eye region image of the user according to the acquisition parameter, and segmenting the eye region image using a full convolutional depth neural network to acquire an eye print image of the user with a sharpness meeting a preset condition; and synthesizing the initial face image and the eye print image acquired from the eye region image into a target face image of the user for face recognition.

2. The method of claim 1, wherein:
a Field of View (FoV) of the first image acquisition apparatus is greater than an FoV of the second image acquisition apparatus.

3. The method of claim 1, wherein:
a Field of View (FoV) of the first image acquisition apparatus is greater than or equal to 45°*100°; and
an FoV of the second image acquisition apparatus is greater than or equal to 50 mm*140 mm.

4. The method of claim 1, wherein a lens of the second image acquisition apparatus is one of an optical zoom lens or a prime lens.

5. The method of claim 1, wherein a Depth of Field (DoF) of the second image acquisition apparatus is greater than or equal to 2 cm.

6. An electronic device, comprising:
a memory storing instructions; and
a processor configured to execute the instructions to:
acquire an initial face image of a user by a first image acquisition apparatus;
determine an acquisition parameter of a second image acquisition apparatus based on the initial face image of the user, wherein determining the acquisition parameter comprises:
determining eye region spatial location information of the user based on the initial face image of the user; and
determining the acquisition parameter based on the eye region spatial location information of the user, wherein the eye region spatial location information of the user comprises location information of two pupil centers of the user;
send the acquisition parameter to a gimbal;
control, by the gimbal, the second image acquisition apparatus to acquire an eye region image of the user according to the acquisition parameter, and segment the eye region image using a full convolutional depth neural network to acquire an eye print image of the user with a sharpness meeting a preset condition; and
synthesize the initial face image and the eye print image acquired from the eye region image into a target face image of the user for face recognition.

7. The electronic device of claim 6, wherein:
a Field of View (FoV) of the first image acquisition apparatus is greater than an FoV of the second image acquisition apparatus.

8. The electronic device of claim 6, wherein:
a Field of View (FoV) of the first image acquisition apparatus is greater than or equal to 45°*100°; and
an FoV of the second image acquisition apparatus is greater than or equal to 50 mm*140 mm.

9. The electronic device of claim 6, wherein a lens of the second image acquisition apparatus is one of an optical zoom lens or a prime lens.

10. The electronic device of claim 6, wherein a Depth of Field (DoF) of the second image acquisition apparatus is greater than or equal to 2 cm.

11. A non-transitory computer-readable medium storing instructions that, when executed by a processor of a device, cause the device to perform an image acquisition method, the method comprising:
acquiring an initial face image of a user by a first image acquisition apparatus;
determining an acquisition parameter of a second image acquisition apparatus based on the initial face image of the user, wherein determining the acquisition parameter comprises:
determining eye region spatial location information of the user based on the initial face image of the user; and
determining the acquisition parameter based on the eye region spatial location information of the user, wherein the eye region spatial location information of the user comprises location information of two pupil centers of the user;
sending the acquisition parameter to a gimbal;
controlling, by the gimbal, the second image acquisition apparatus to acquire an eye region image of the user according to the acquisition parameter, and segmenting the eye region image using a full convolutional depth neural network to acquire an eye print image of the user with a sharpness meeting a preset condition; and
synthesizing the initial face image and the eye print image acquired from the eye region image into a target face image of the user for face recognition.

* * * * *

UNITED STATES PATENT AND TRADEMARK OFFICE
CERTIFICATE OF CORRECTION

| | |
|---|---|
| PATENT NO. | : 11,205,071 B2 |
| APPLICATION NO. | : 16/774045 |
| DATED | : December 21, 2021 |
| INVENTOR(S) | : Chenguang Ma et al. |

It is certified that error appears in the above-identified patent and that said Letters Patent is hereby corrected as shown below:

On the Title Page

Item (71), delete "Advanced Technologies Co., Ltd.," and insert --Advanced New Technologies Co., Ltd.,--.

Signed and Sealed this
Twelfth Day of July, 2022

Katherine Kelly Vidal
*Director of the United States Patent and Trademark Office*